(12) United States Patent
Ito et al.

(10) Patent No.: US 7,905,339 B2
(45) Date of Patent: Mar. 15, 2011

(54) OPERATION MECHANISM OF WORKING MACHINE

(75) Inventors: Tomoki Ito, Wako (JP); Kazuyoshi Miyahara, Wako (JP); Nobuo Yamazaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 631 days.

(21) Appl. No.: 11/987,171

(22) Filed: Nov. 28, 2007

(65) Prior Publication Data

US 2008/0121491 A1    May 29, 2008

(30) Foreign Application Priority Data

Nov. 29, 2006   (JP) ................ P2006-321970

(51) Int. Cl.
*B60K 23/02*    (2006.01)
(52) U.S. Cl. .............. 192/83; 74/480 R; 192/99 S
(58) Field of Classification Search .......... None
See application file for complete search history.

(56) References Cited

U.S. PATENT DOCUMENTS 7,644,781 B2 *   1/2010   Moriyama et al. .......... 192/99 R

FOREIGN PATENT DOCUMENTS

| FR | 2 623 765 A1 | | 6/1989 |
|---|---|---|---|
| GB | 2 212 889 A | * | 8/1989 |
| JP | 4-113224 U | | 10/1992 |
| JP | 4-307120 A | * | 10/1992 |
| JP | 06 320977 A | | 11/1994 |
| JP | 07-009877 A | | 1/1995 |
| JP | 09 048257 A | | 2/1997 |
| JP | 06 312628 A | | 11/1997 |
| JP | 11-170885 A | | 6/1999 |
| JP | 2003-011691 A | | 1/2003 |
| JP | 2003-072412 A | | 3/2003 |
| JP | 2005-088769 A | | 4/2005 |
| JP | 2006-116977 A | | 5/2006 |

OTHER PUBLICATIONS

Translation, JP 6-320977 A, Jun. 30, 2010.*
Translation, JP 9-048257 A, Jul. 1, 2010.*

* cited by examiner

*Primary Examiner* — Rodney H Bonck
(74) *Attorney, Agent, or Firm* — Arent Fox LLP

(57) ABSTRACT

Operation mechanism of a working machine includes a main clutch lever pivotably provided on an operating handle, and a pivot member operable in interlocked relation to pivoting operation of the main clutch lever. The pivot member pivots about a pivot point differing in position from a pivot point of the main clutch lever. When fully pulled by pivoting operation of the main clutch lever, the cable member is located nearest to the pivot point of the pivot member, so that force reverse-pivoting the pivot member is reduced.

3 Claims, 11 Drawing Sheets

OPERATION MECHANISM OF WORKING MACHINE

CROSS-REFERENCE TO RELATED APPLICATION

This application claims the priority of Japan Application No. P2006-321970, filed Nov. 29, 2006, the entire specifications, claims and drawings of which are incorporated herewith by reference.

FIELD OF THE INVENTION

The present invention relates to an operation mechanism of a working machine which is provided on an operating handle and includes a clutch lever for remote-operating a clutch.

BACKGROUND OF THE INVENTION

JP 2005-88769 A discloses a travel safety device of a working machine, which is provided with a "deadman clutch lever" intended to reduce fatigue of a human operator operating the working machine and an emergent stop mechanism for stopping the working machine in case of an emergency during rearward travel. Further, JP 2006-116977 A discloses a travel clutch mechanism including a main clutch lever disposed above an operating handle and side clutch levers disposed beneath the operating handle.

The travel safe device disclosed in JP 2005-88769 A includes a release rod disposed to protrude rearwardly of the rear end of a handle post and movable in a front-rear direction, and a holding plate for holding the deadman clutch lever in an ON position. The holding plate holds the deadman clutch lever in the ON position even when a human operator releases the deadman clutch lever after first gripping and moving the deadman clutch lever into the ON position and then moving a compression lever rearwardly. In an emergency, the release rod is moved forward to release the holding plate and place a travel clutch in an OFF state. Thus, the working machine can keep traveling without the human operator continuing gripping the deadman clutch lever together with a grip portion of the operating handle during travel of the working machine.

However, with the aforementioned travel safety device, there would arise the problem that, when the travel clutch is to be held in the ON state, the human operator has to move the release rod rearwardly by putting his or her finger on the release rod after gripping the deadman clutch lever together with the grip portion of the operating handle, which would undesirably increase the number of necessary operation steps, take a lot of trouble and lower the operability.

With the travel clutch lever disclosed in JP 2006-116977 A, a toggle spring retained on the main clutch lever crosses upward over the pivot shaft (or pivot point) of the main clutch lever when the human operator operates the main clutch lever into a clutch-in (or clutch-ON) position. Thus, human operator's force necessary to grip and operate the main clutch lever toward the grip portion of the operating handle can be effectively supplemented, so that the main clutch lever can be operated comfortably.

However, when the main clutch lever is to be pivoted from the upper, OFF position to the lower, ON position, the aforementioned travel clutch lever would present the problem that the main clutch lever is hard to pivot downward because the resilient force of the toggle spring becomes resistance to the pivoting movement of the main clutch lever. Namely, because the resilient force of the toggle spring is added to the resilient force of an ordinary return spring used, the pivoting movement of the main clutch lever is subjected to greater resistance, which would thus lower the operability of the main clutch lever.

SUMMARY OF THE INVENTION

In view of the foregoing prior art problems, it is an object of the present invention to provide an improved operation mechanism of a working machine which can achieve enhanced operability of a main clutch lever by allowing a human operator to continue gripping the, main clutch lever with reduced force while securing a given stroke amount of a cable member.

According to the present invention, there is provided an improved operation mechanism of a working machine, which comprises: a main clutch lever pivotably provided on an operating handle; a pivot member pivotable in response to pivoting operation of the main clutch lever; and a cable member for turning on a clutch mechanism in response to pivoting movement of the pivot member. The pivot member includes: a cable connection section having one end portion of the cable member connected thereto; and a pivot point disposed between a portion of the cable member located near the cable connection section and a pivot point of the main clutch lever.

When the cable member has been fully pulled by pivoting movement of the pivot member operable in interlocked relation to pivoting operation of the main clutch lever, the cable member is located nearest to the pivot point of the pivot member, so that a distance between the cable member and the pivot member decreases; thus, force that reverse-pivots the pivot member can be reduced. As a result, the present invention can effectively reduce the gripping force (with which a human operator has to continue gripping the main clutch lever) while securing a given stroke amount of the cable member and thus achieve significantly-enhanced operability of the main clutch lever.

Preferably, the operation mechanism further comprises a first clutch-OFF switch mechanism disposed near the operating handle, and a clutch-OFF mechanism for canceling the connection between the main clutch lever and the pivot member, in response to operation of the first clutch-OFF switch mechanism, to turn off the clutch mechanism. Thus, the clutch mechanism can be turned off even while the main clutch lever is being gripped by the human operator; as a result, the operability can be even further enhanced.

Preferably, the clutch-OFF mechanism further includes a second clutch-OFF switch mechanism rotatably supported on the operating handle and disposed beneath the operating handle. When the second clutch-OFF switch mechanism is operated, the clutch-OFF mechanism transmits operating force from the second clutch-OFF switch mechanism to the first clutch-OFF switch mechanism to turn off the clutch mechanism. Thus, the present invention can turn off the clutch mechanism even while the main clutch lever is being gripped by the human operator, so that the operability can be even further enhanced.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
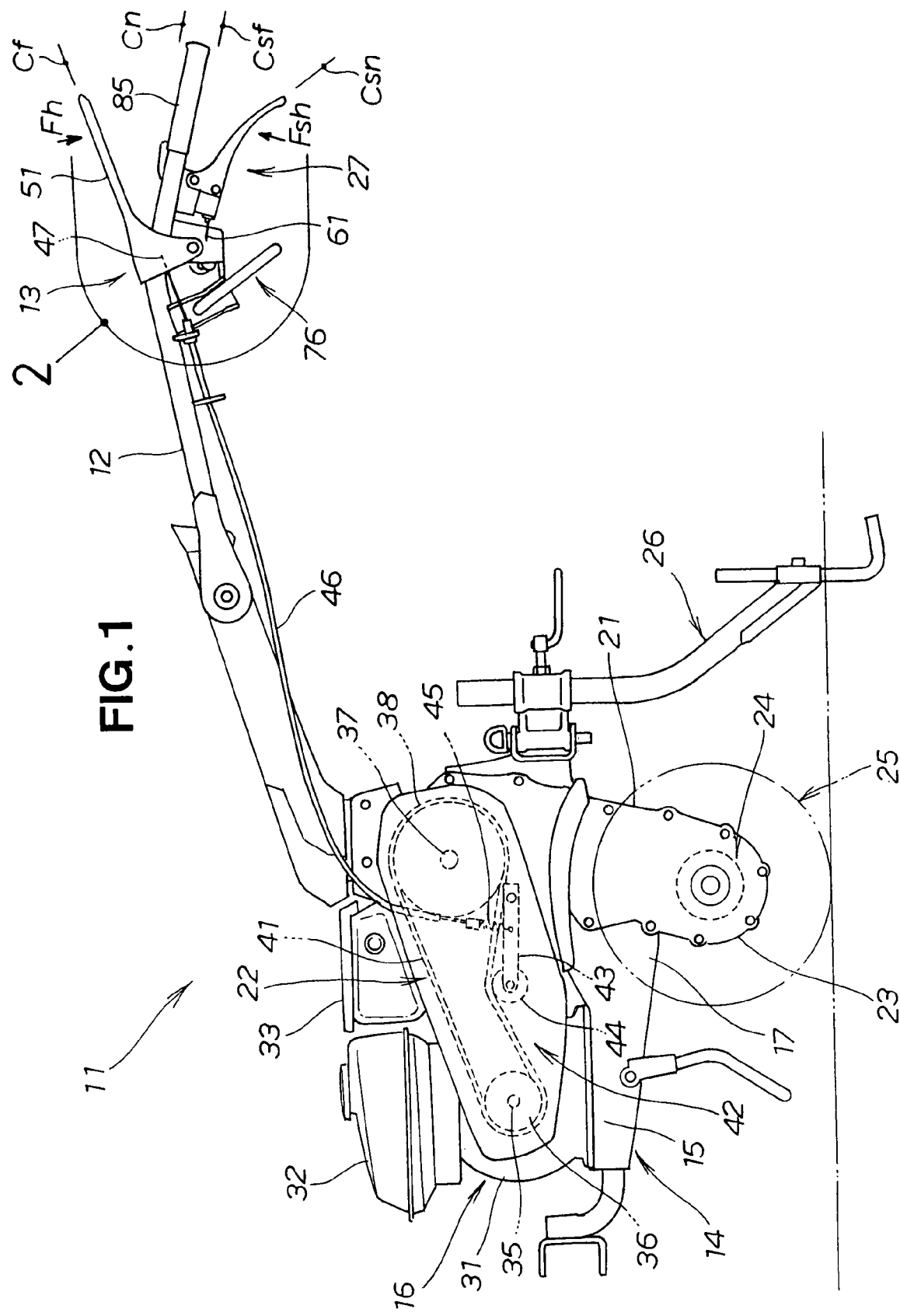
FIG. 1 is a side view of a working machine provided with an operation mechanism according to an embodiment of the present invention.

Referring first to FIG. 1, a working machine 11 such as a tilling machine, to which is applied the present invention, includes an operation mechanism 13 provided on an operating handle 12, an engine 16 provided on an upper portion 15 of a machine body 14, a transmission case 21 provided on a rear portion 17 of the machine body 14, a transmission mechanism (not shown) provided within the transmission case 21, a belt transmission mechanism 22 for transmitting drive force from the engine 16 to the transmission mechanism, side clutches 23 provided in left and right lower end portions of the transmission case 21, traveling wheels 25 driven by the drive force from the side clutches 24, a resistance rod 26 provided on a rear end portion of the transmission case 21, and side clutch levers provided on left and right upper portions of the operating handle 12.

The operating handle 12 has a lower end portion attached to an upper end portion of the transmission case 21. Fuel tank 32 and air cleaner 33 are attached to an upper portion of an engine body 31.

Belt transmission mechanism 22 includes a driving pulley 36 mounted on an output shaft 35 of the engine 16, a driven pulley 38 mounted on an input shaft 37 of the transmission mechanism, and a transmission belt 41 wound at its opposite ends on the driving pulley 36 and driven pulley 38. Drive force from the output shaft 35 is transmitted to the transmission mechanism via the input shaft 37.

As the input shaft 37 rotates, the drive force of the input shaft 37 is transmitted to the traveling wheels 25 via the transmission mechanism and side clutches 24.

The belt transmission mechanism 22 includes a clutch mechanism 42. The clutch mechanism 42 includes a pivotable arm 43, a tension roller 44 mounted on a distal end of the arm 43, a shock-absorbing spring 46 connected retained at its one end on a middle portion of the arm 43, and a clutch cable 46 connected to the other end of the spring 45.

The clutch cable 46 has one end portion 47 to the operation mechanism 13. The clutch mechanism 42 is operated by a human operator pulling the clutch cable 46 via a main clutch lever ("deadman clutch lever") 51.

The belt mechanism 22 is shifted from an OFF state to an ON state by the human operator applying operating force Fh to the main clutch lever 51 to thereby pivot the lever 51 from a clutch-OFF position Cf to a clutch-ON position Cn. As a consequence, the traveling wheels 25 are driven, via the side clutches 24, for soil-cultivating or tilling operation.

Once the human operator releases (i.e., releases his or her hand from) the main clutch lever 51 to remove the operating force, the clutch lever 51 returns to the clutch OFF position Cf and the clutch mechanism 42 shifts from the ON state to the OFF state, so that the traveling wheels 25 having so far been driven are stopped.

As seen from the foregoing, the operation mechanism 13 performs a predetermined clutching operation by the clutch cable 46 being pulled in response to the human operator operating the main clutch lever 51 provided on the operating handle. "performing a clutching operation" means placing the clutch mechanism 42 in the ON state or OFF state, i.e. turns on or off the clutch mechanism 42.

Figure 2:
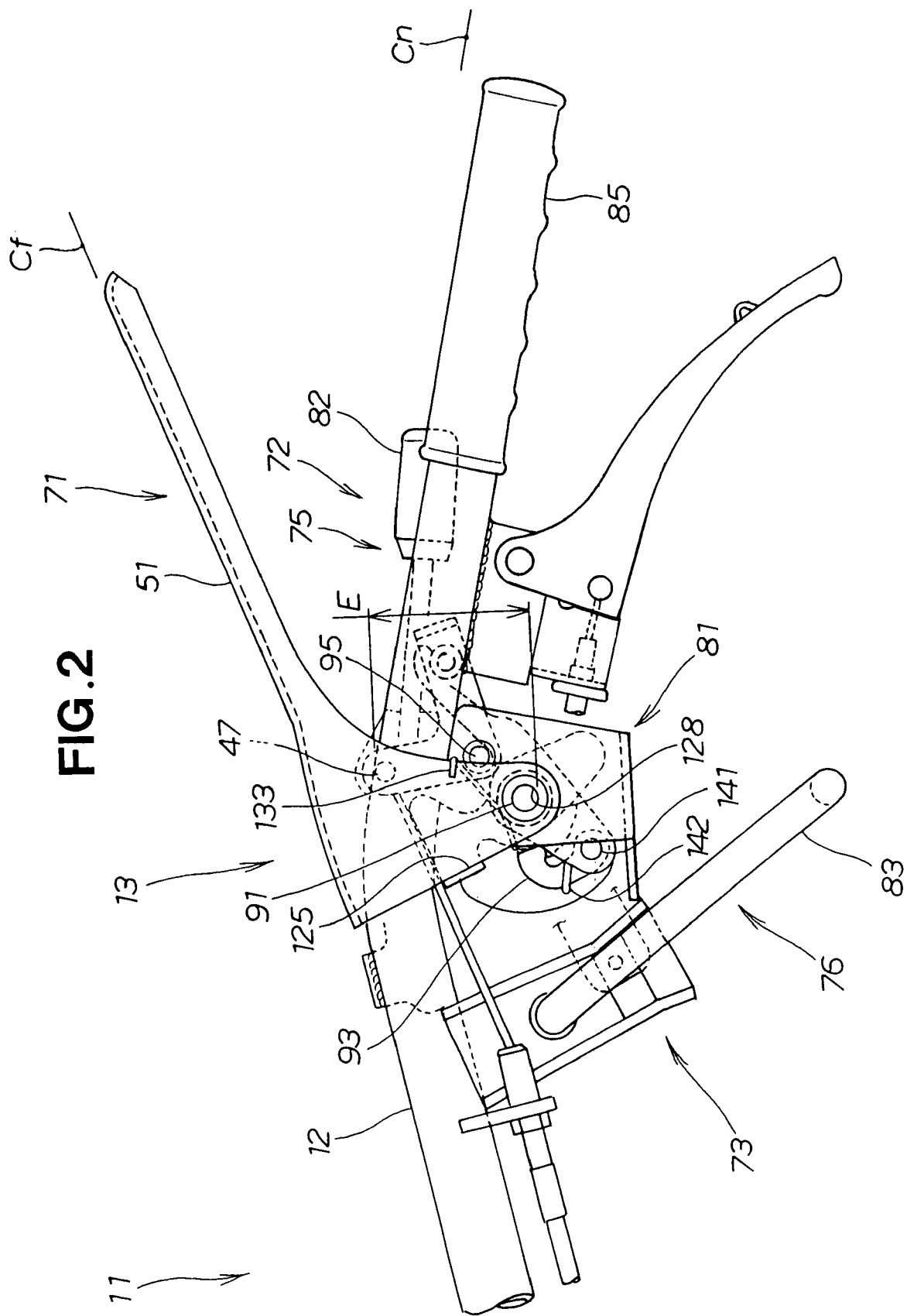
FIG. 2 is a view showing in enlarged scale a "2" section shown in FIG. 1.

As shown in FIG. 2, the operation mechanism 13 includes a clutch-ON mechanism 71 for the operator to turn on the clutch by gripping the main clutch lever 51, a clutch-OFF mechanism 72 for the human operator to turn off the clutch while gripping the main clutch lever 51, and a compulsory clutch-OFF mechanism 73.

The clutch-ON mechanism 71 turns on the clutch mechanism 42 of FIG. 1 in response to the human operator gripping the main clutch lever 51. The clutch-OFF mechanism 72 compulsorily turns off the clutch mechanism 42, via a first clutch-OFF switch mechanism 75, even while the main clutch lever 51 is being gripped by the human operator.

The compulsory clutch-OFF mechanism 73 compulsorily activates the clutch-OFF mechanism 72, via a second clutch-OFF switch mechanism 76, even while the main clutch lever 51 is being gripped by the human operator.

Left and right support brackets 81 are fixed to the operating handle 12, and one of the support brackets (e.g., left support bracket) 81 pivotably supports the main clutch lever 51, an operating section 82 of the first clutch-OFF switch mechanism 75 and an emergency stop lever 83 of the second clutch-OFF switch mechanism 76.

Figure 3:
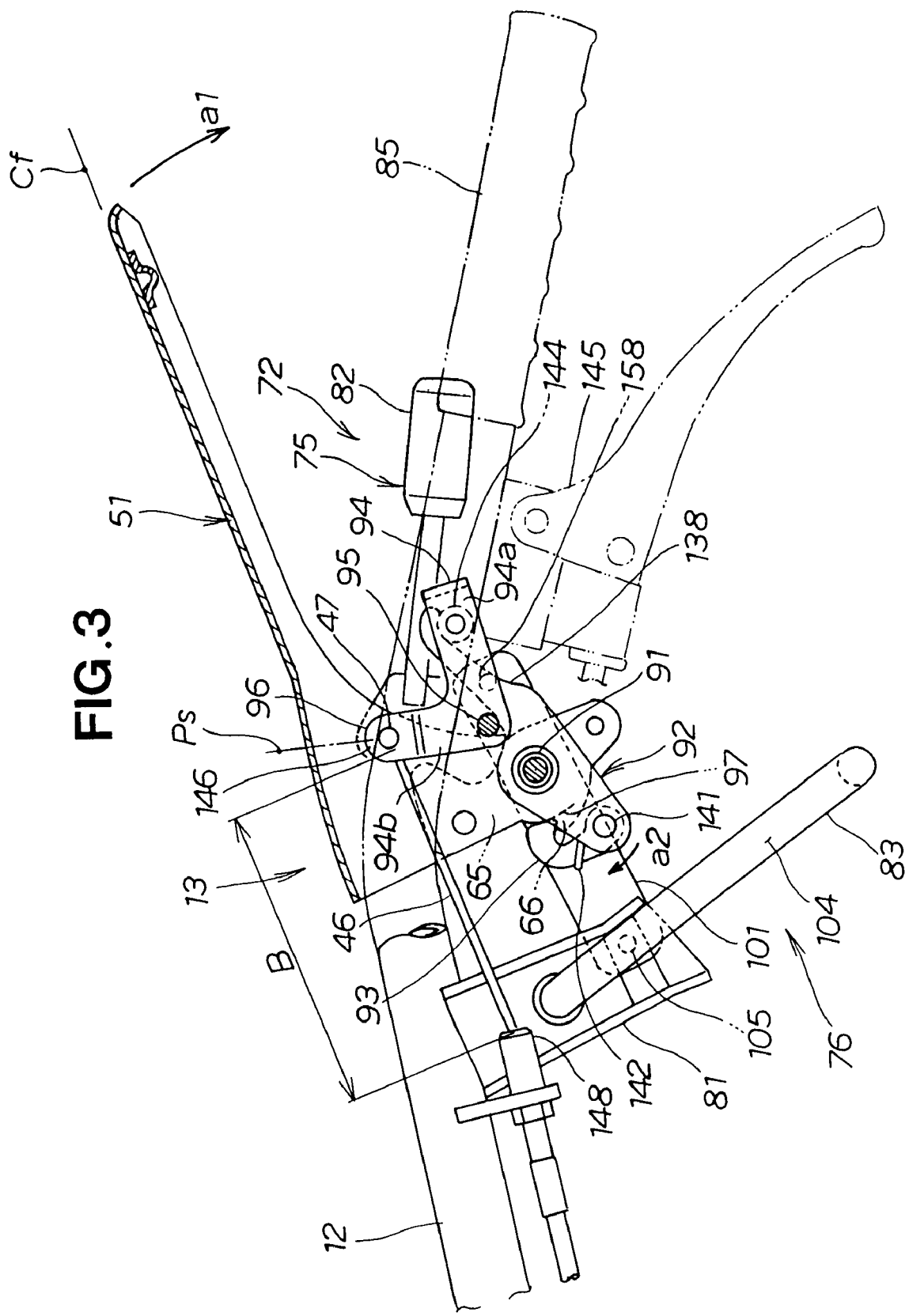
FIG. 3 is a view of the operation mechanism, which particularly shows in section a main clutch lever of FIG. 2.
Figure 4:
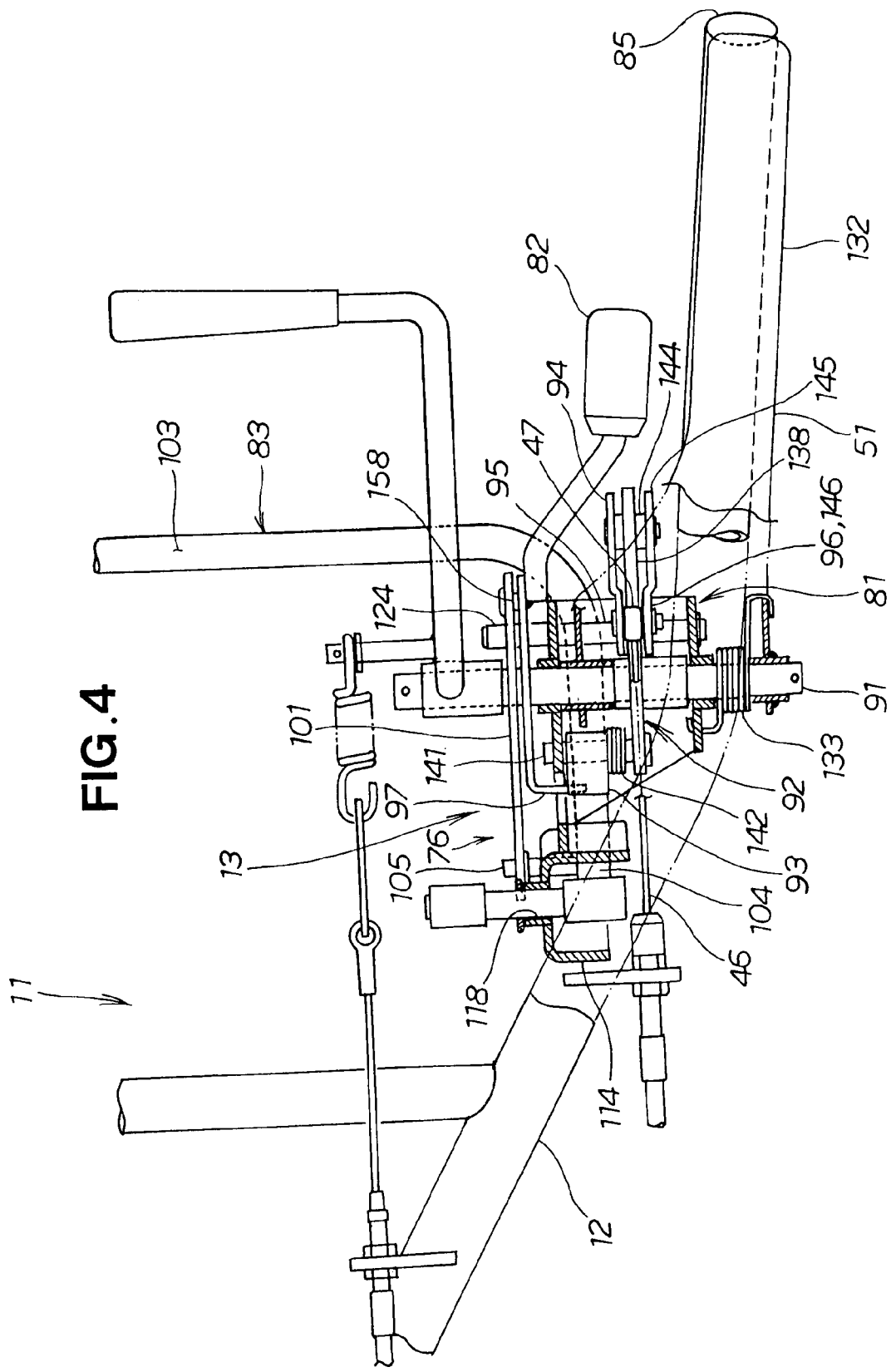
FIG. 4 is a top plan view of the operation mechanism, which particularly shows in section a support bracket of FIG. 2.

FIGS. 3 and 4 show the operation mechanism 13 with part of the support bracket (e.g., left support bracket) 81 taken away. The support bracket 81 is fixed by welding to a front portion of a left grip 85 of the operating handle 12. The main clutch lever 51 and first pivot member (deadman plate) 92 are pivotably supported on the support bracket 81 via a first pivot shaft (i.e., first pivot point) 91, and a ratchet 93 is pivotably attached to the first pivot member 92.

L-shaped, second pivot member (plate lever) 94 is pivotably attached to the support bracket 81 via a second pivot shaft (second pivot point) 95. The clutch cable 46 is connected at one end portion 47 to the second pivot member 94. Reference character Ps represents an initial position of the second pivot member 94.

The first clutch-OFF switch mechanism 75 includes the operating section 82, and a claw-disengaging section 97 for canceling an engaging state of the ratchet 93 in response to input from the operating section 82.

The second clutch-OFF switch mechanism 76 includes the emergency stop lever 83 pivotably attached to the support bracket 81, and a meshing-engagement cancellation plate (link plate) 101 connected to the emergency stop lever 83.

The emergency stop lever 83 includes a first bar 103 extending between the left and right support brackets 81 (only the left support bracket 81 is shown in the figures), and left and right second bars 104 (only one of which is shown in the figures) fitted in the left and right support brackets 81. The left second bar 104 has a pin 105, and the above-mentioned meshing-engagement cancellation plate 101 is connected to the pin 105.

Figure 5:
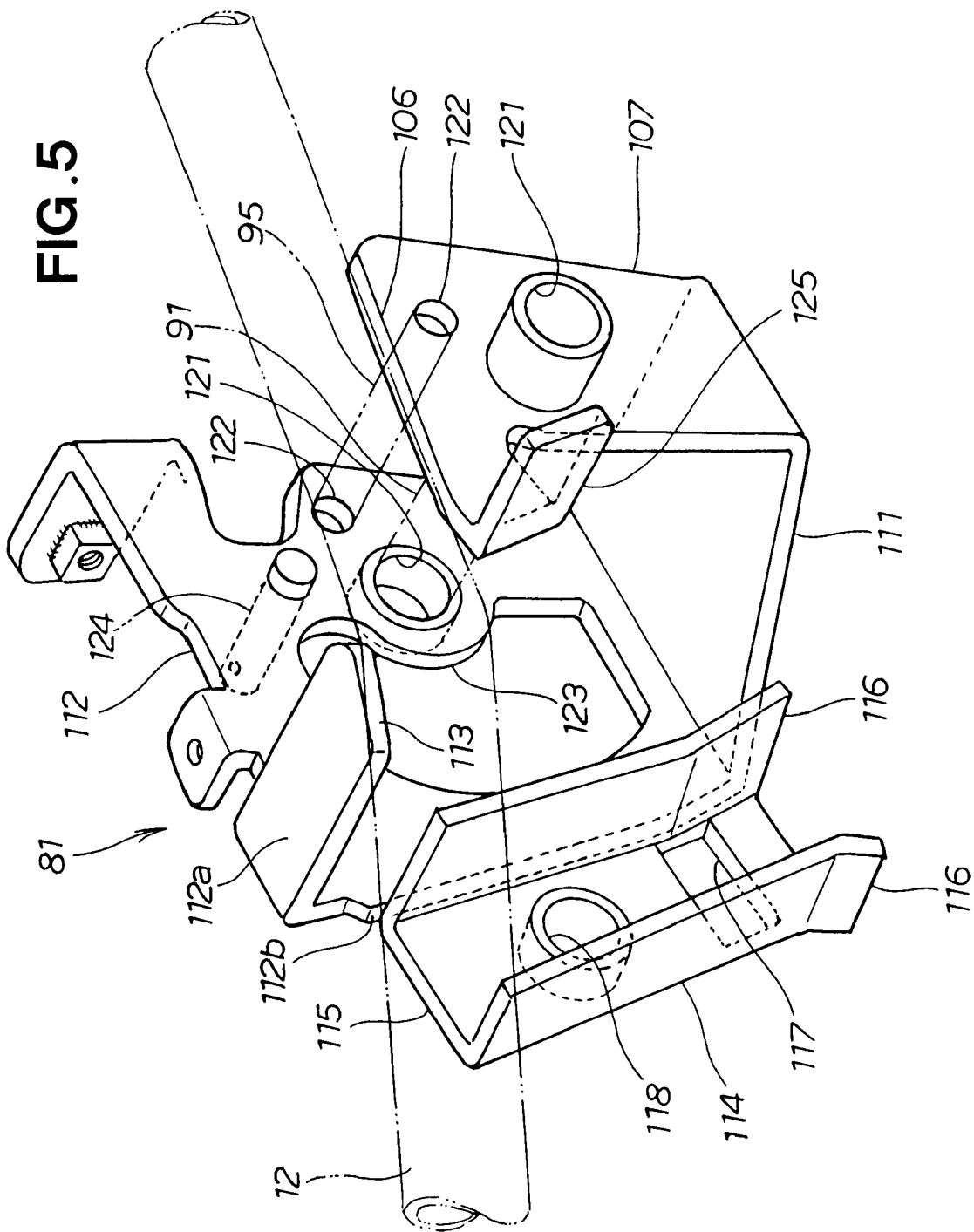
FIG. 5 is a perspective view of the support bracket shown in FIG. 2.
Figure 6:
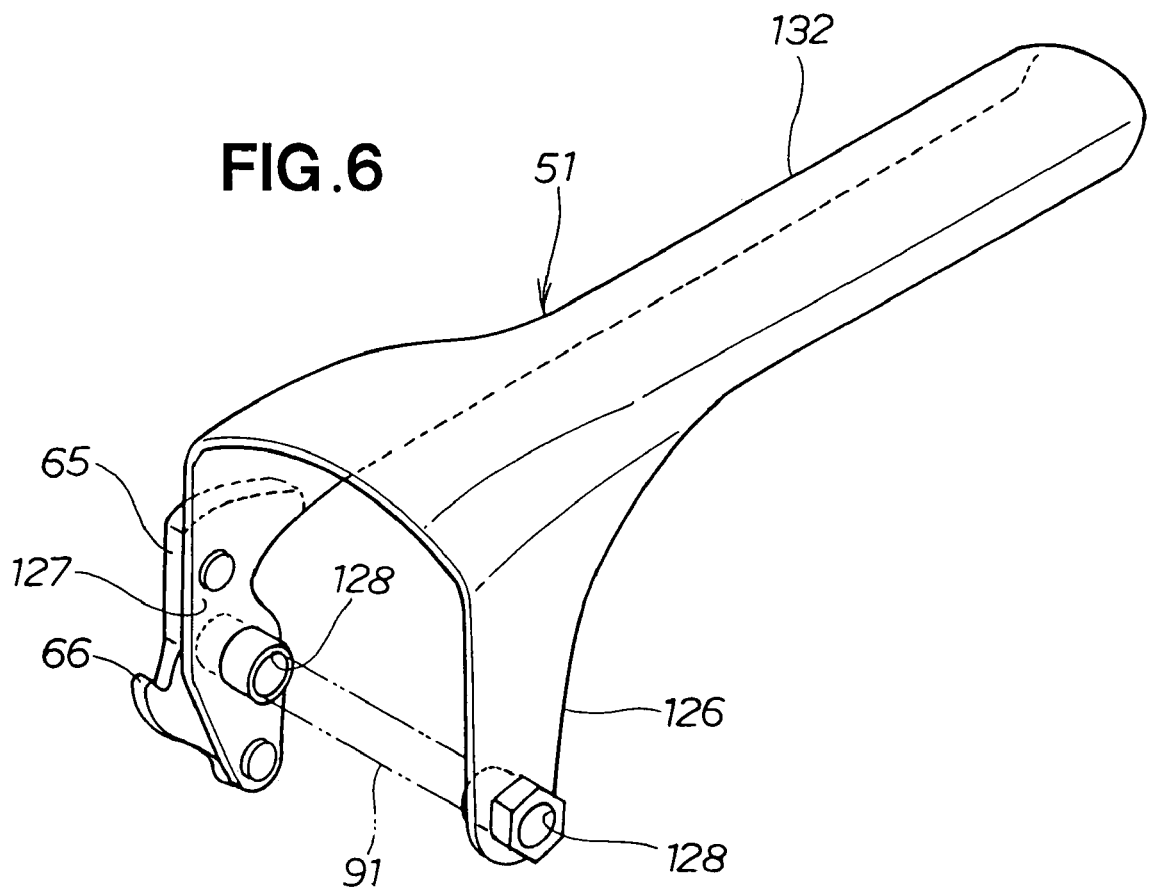
FIG. 6 is a perspective view of the main clutch lever.

As shown in FIGS. 2, 3 and 5, each of the support bracket 81, which has a generally "U" sectional shape, has a first side wall portion 107, a second side wall portion 112 and a bottom portion 111 connecting between the first and second side wall portions 107 and 112. First edge portion 106 defining the upper edge of the first side wall portion 107 of the support bracket 81 is fixed by welding to the operating handle 12. The second side wall portion 112 has a portion 112a bent toward the first side wall portion 107. Second edge portion 113 defining the inner edge of the bent portion 112a is fixed by welding to the operating handle 12. The second wall portion 112 has, on its front edge 112a, a bracket 114 of a U sectional shape for pivotably supporting the emergency stop lever 83 shown in FIG. 2.

Third edge portion 115 defining the upper end of the bracket 114 is fixed by welding to the operating handle 12. Lower end portion of the bracket 114 is formed as stopper portions 116 flaring obliquely downward away from each other. The stopper portions 116 are formed so as to limit pivoting movement of the second bar 104. Opening 117 for insertion therein of the pin 105 of the second bar 104 is formed in a lower end portion of the bracket 114. Boss hole 118 for rotatably support the emergency stop lever 83 of the second clutch-OFF switch mechanism 76 is formed centrally in the bracket 114.

The first and second wall portions 107 and 112 have first boss holes 121 formed for insertion therethrough of the first pivot shaft 91, and second boss holes 122 formed for insertion therethrough of the second pivot shaft 95.

The second wall portion 112 has an opening 123 formed to avoid interference with the first pivot member 92 (FIG. 3), and a third pivot shaft 124 mounted thereto for supporting the first clutch-OFF switch mechanism 75 (FIG. 3).

The first wall portion 107 has a stopper projection 125 formed on its front edge for holding the main clutch lever 51 (FIG. 3) in the OFF position Cf. As shown in FIGS. 2, 3, 4 and 6, the main clutch lever 51, which has a generally U sectional shape, first and second supporting leg portions 126 and 127, lever holes 128 (FIG. 2) formed in the first and second supporting leg portions 126 and 127 for rotatable insertion therethrough of the first pivot shaft 91, a lock plate 65 mounted on the first pivot shaft 91, a grip portion 132 extending rearward from the first and second supporting leg portions 126 and 127, and a clutch lever spring 133 (FIG. 4) retained on the first supporting leg portion 126. The main clutch lever 51 is pivotable about the first pivot shaft 91. Thus, the first pivot shaft 91 functions as the first pivot point of the main clutch lever 51. The clutch lever spring 133 normally biases the main clutch lever 51 to the clutch-OFF position Cf. The ratchet 93 shown in FIG. 3 disengageably engages with a tooth portion 66 of the lock plate 65.

Figure 7:
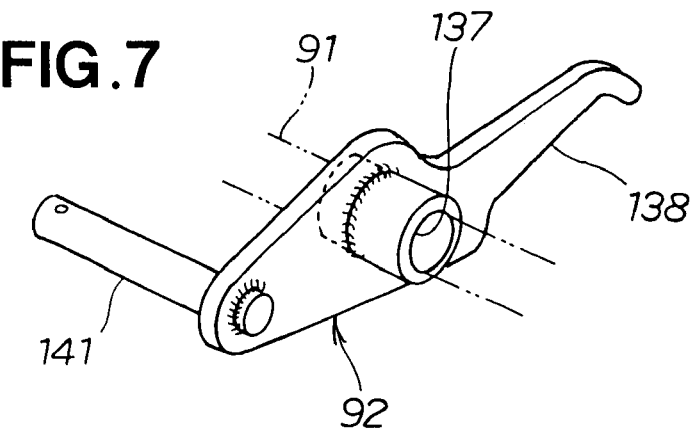
FIG. 7 is a perspective view of a first pivot member shown in FIG. 3.

FIG. 7 shows details of the first pivot member 92 shown in FIG. 3. As shown in FIGS. 3, 4 and 7, the first pivot member 92 has a central hole 137 for insertion therethrough of the first pivot shaft 91, a cam portion 138 formed on one end portion thereof, a support pin 141 provided on another end portion thereof, and a claw spring 142 wound on the support pin 141 and having one end portion engaging with the ratchet 93. As shown in FIGS. 3 and 4, the second pivot member 94 includes an L-shaped body 145 having first and second leg portions 94a and 94b. Roller 144 rotatably supported on the first leg portion 94a moves along the lower surface of the cam portion 138 of the first pivot member 92. The second leg portion 94b has a cable connection portion 146 for connecting thereto the one end portion 47 of the clutch cable 46. The second pivot member 94 pivots about the second pivot shaft 95; thus, the second pivot shaft 95 functions as a second pivot point.

As set forth above, the second pivot member 94 has the second pivot point 95 differing in position from the first pivot point 91 of the main clutch lever 51. Namely, as viewed from a side of the working machine 11 (FIG. 1), the second pivot point 95 of the second pivot member 94 is disposed between a portion of the clutch cable 46 located near the cable connection section 146 (i.e., a portion of the cable 46 located in a range of a distance B from the one end portion 47 to a coated end portion 148 of the clutch cable 46) and the first pivot point 191 of the main clutch lever 51; that is, the second pivot point 95 is located in a range of a distance E as viewed from a side of the working machine 11, as shown in FIG. 2.

The first pivot member 92 is pivotably supported on the first pivot shaft 91 that rotatably supports thereon the main clutch lever 51. Namely, the pivot point of the first pivot member 92 is identical to the first pivot point 91 of the main clutch lever 51.

Therefore, when the main clutch lever 51 is operated to pivot, the first pivot member 92 causes the second pivot member 94 to pivot, via the cam portion 138 and roller 144, until the clutch cable 46 reaches near the second pivot shaft (second pivot point) 95.

The ratchet 93 is pivotably supported on the support pin 141 of the first pivot member 92 shown in FIG. 3. This ratchet 93 is normally biased by the claw spring 142 in a direction where it is held in engagement with the tooth portion 66 of the lock plate 65.

As the human operator operates downwardly the operating section 82 of the first clutch-OFF switch mechanism 75, the ratchet 93 is flipped up, against the biasing force of the claw spring 142, out of the engagement with the tooth portion 66 of the lock plate 65.

Figure 8:
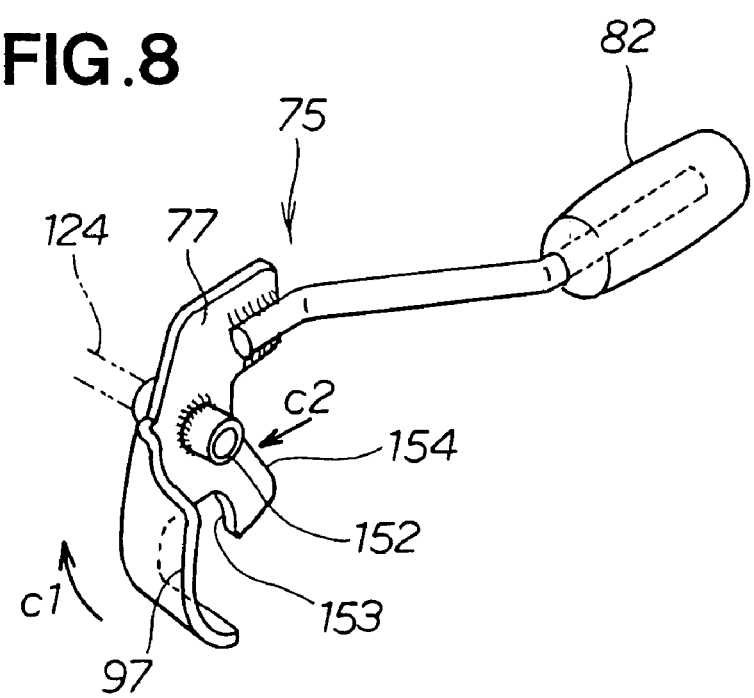
FIG. 8 is a perspective view of a first clutch-OFF switch mechanism shown in FIG. 3.

FIG. 8 shows details of the first clutch-OFF switch mechanism 75. As shown in FIGS. 3, 4 and 8, the first clutch-OFF switch mechanism 75 includes the operating section 82 fixed to one end portion of a body 77 and operable with a hand of the human operator, and a switch pivot point hole 152 formed centrally in the body 77 such that the third pivot shaft 124, pivotably supporting the body 77, is fitted in the hole 152. The first clutch-OFF switch mechanism 75 also includes the claw-disengaging section 97 formed at another end portion of the body 77 such that, as it pivots in a direction of an arrow c1, it abuts against the ratchet 93 (FIG. 3) to disengage the ratchet 93, a recessed portion 153 for avoiding interference with the first pivot shaft 91 (FIG. 3), and a force receiving portion 154 for receiving force from the second clutch-OFF switch mechanism 76 (FIG. 3), as indicated by an arrow c2, to cause the body 77 to pivot.

The claw-disengaging section 97 also functions as a guide for the disengaged ratchet 93, so as to avoid interference with the main clutch lever 51.

Figure 9:
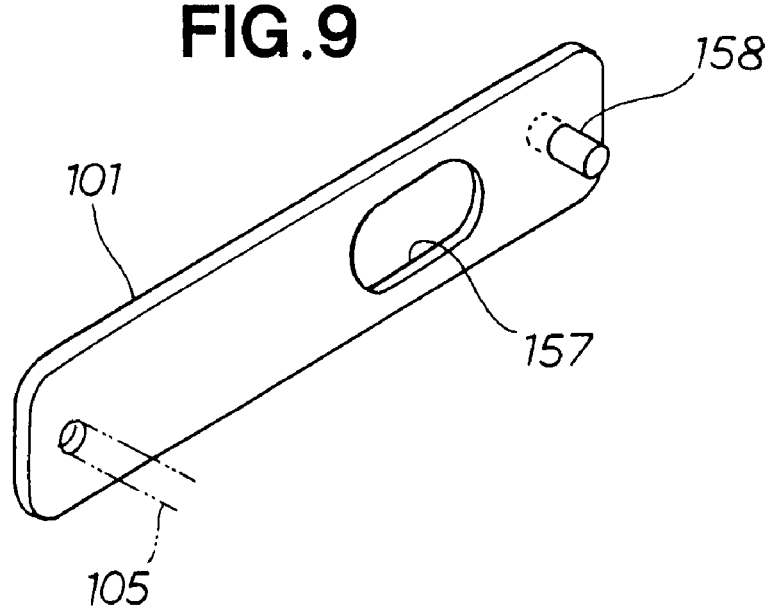
FIG. 9 is a perspective view of a meshing-engagement cancellation plate of a second clutch-OFF switch mechanism shown in FIG. 3.

FIG. 9 shows the meshing-engagement cancellation plate 101 of the second clutch-OFF switch mechanism. As the emergency stop lever 83 is operated, the meshing-engagement cancellation plate 101 interlocks with the first clutch- OFF switch mechanism 75 to cancel the meshing engagement between the ratchet 93 and the tooth portion 66 of the lock plate 65.

Referring now to FIGS. 3, 4 and 9, the meshing-engagement cancellation plate 101 is connected at one end with the pin 105 of the emergency stop lever 83, and has a projecting pin 158 on another end portion. By the projecting pin 158 abutting against the force receiving portion 154 of the first clutch-OFF switch mechanism 75 shown in FIG. 8, the body 77 of the first clutch-OFF switch mechanism 75 is caused to pivot, so that the ratchet 93 is lifted up, by the claw-disengaging portion 97, out of the engagement with the lock plate 65.

Elongated hole 157 is formed in a portion of the disengaging plate 101 adjacent to the other end of the plate 101, and the first pivot shaft 91 extends through the hole 157 in such a manner that the disengaging plate 101 may not interfere with the first shaft 91 when the emergency stop lever 83 is operated.

Next, behavior of the main clutch lever 51 and second pivot member 94 will be described with primary reference to FIGS. 3, 10A and 10B.

First, once the human operator starts gripping the main clutch lever 51, as indicated by an arrow a1, when the lever: 51 is in the clutch-OFF position Cf, the first pivot member 92 starts rotating in a direction of an arrow a2 by means of the ratchet 93 meshing with the tooth portion 66 of the lock plate 65.

Figure 10A:
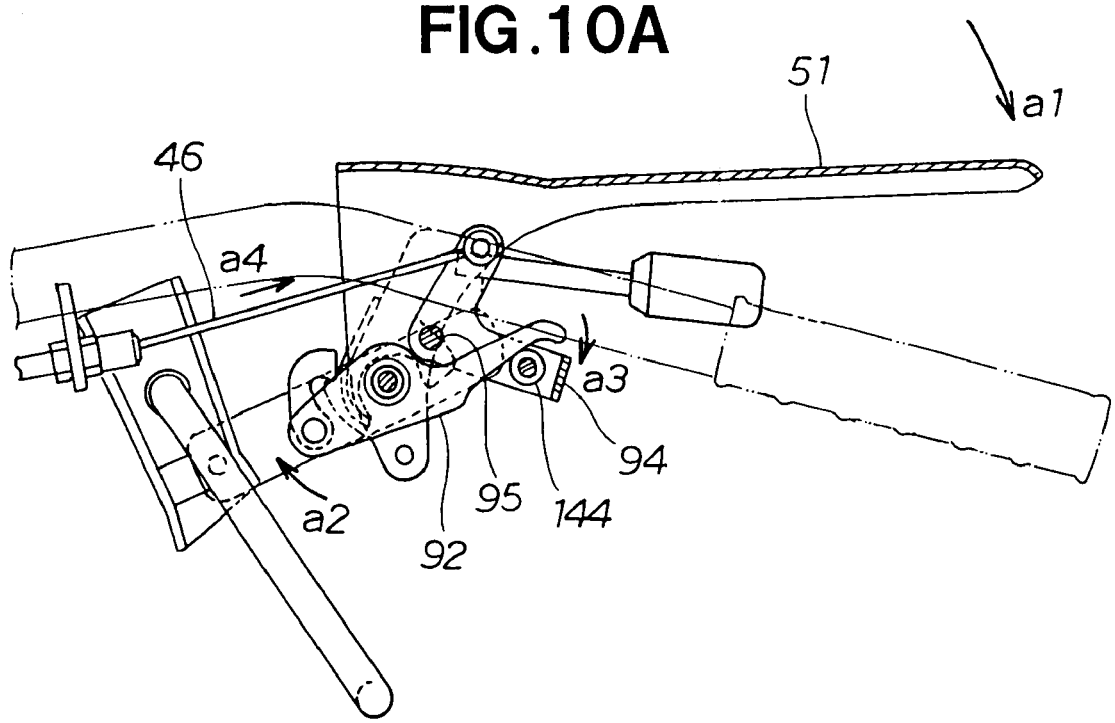
FIGS. 10A and 10B are partly-sectional views showing a manner in which the pivot member pulls a cable member in response to pivoting operation of the main clutch lever.

As the first pivot member 92 rotates in the direction of the arrow a2, the roller 144 starts rolling and the second pivot member 94 pivots about the second pivot shaft 95, in a direction of an arrow, a3, to start pulling the clutch cable 46 as indicated by an arrow a4, as shown in FIG. 10A.

Figure 10B:
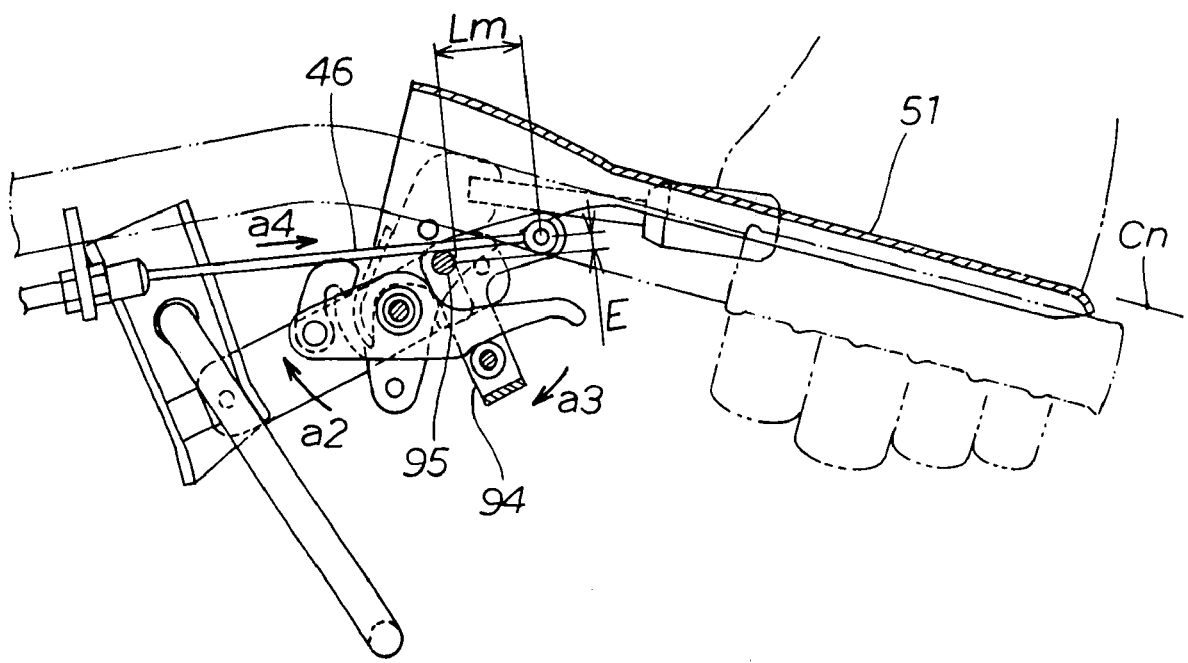

As the human operator continues the pivoting operation of the main clutch lever 51, the clutch lever 51 is further pulled by further pivoting movement of the second pivot member 94, as shown in FIG. 10B.

Once the main clutch lever 51 reaches the clutch-ON position Cn in response to the human operator pivoting the main clutch lever 51 to a fully-pivoted position, the clutch cable 46 takes a maximum-pulled state (i.e., state in which the cable 46 has been pulled by a given stroke amount Lm), and the distance E between the cable 46 and the second pivot shaft 95 has now decreased. Therefore, force applied to the second pivot member 94, via the clutch cable 46, to return the pivot member 94 (in a direction opposite the arrow a3 direction) is reduced; thus, the force with which the human operator has to continue gripping the main clutch lever 51 can be reduced.

As a consequence, the instant embodiment can effectively reduce the necessary gripping force (with which the human operator has to continue gripping the main clutch lever 51) while securing the stroke amount Lm of the clutch cable 46 and thus achieve enhanced operability of the main clutch lever 51.

Once the human operator releases the main clutch lever 51, the main clutch lever 51 is returned to the clutch-OFF position Cf via the clutch lever spring 133 (FIG. 4).

Figure 11:
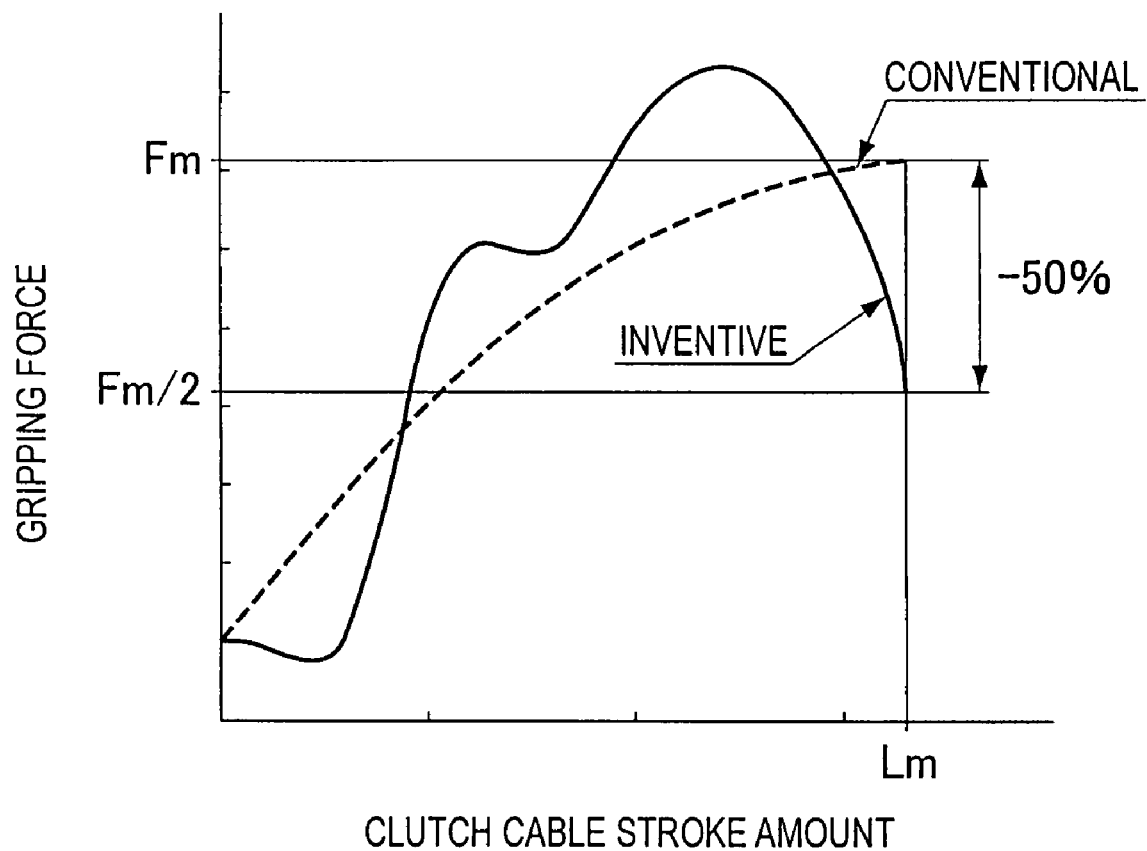
FIG. 11 is a graph showing relationship between gripping force to be applied to the main clutch lever and stroke amount of the cable member.

FIG. 11 is a graph showing relationship between the gripping force to be applied to the main clutch lever 51 (i.e., with which the human operator has to continue gripping the main clutch lever 51) and the stroke amount of the clutch cable 46, where the horizontal axis represents the stroke amount and the vertical axis represents the gripping force (operating load). Broken line indicates a curve of an example of a conventionally-known machine provided with no operation mechanism constructed like the aforementioned operation mechanism 13, while a solid line indicates a curve of the instant embodiment provided with the aforementioned operation mechanism 13.

Further, in FIG. 11, Fm indicates the gripping force (operating load) in the conventionally-known machine; namely, with the conventionally-known machine, the human operator has to continue gripping the main clutch lever with the gripping force Fm. Fm/2 indicates the gripping force (operating load) in the instant embodiment; namely, with the instant embodiment, the human operator only has to continue gripping the main clutch lever 51 with about half (i.e., 50%) of the gripping force Fm in the conventionally-known machine. Thus, the instant embodiment can reduce the gripping force to be applied to the main clutch lever 51 while securing the stroke amount Lm of the cable member 46.

Figure 12A:
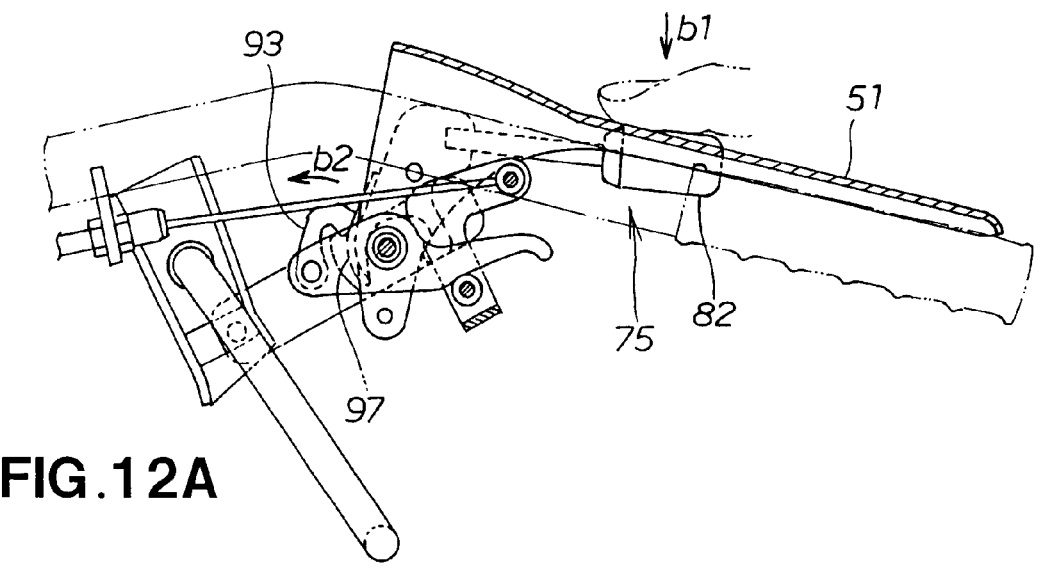
FIGS. 12A-12C are views showing behavior when the first clutch-OFF switch mechanism has been operated.
Figure 12B:
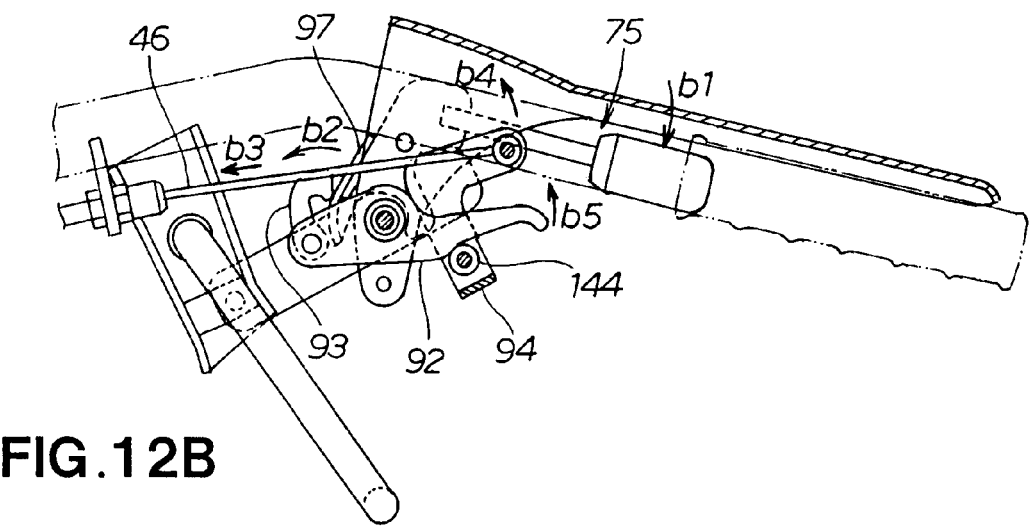
Figure 12C:
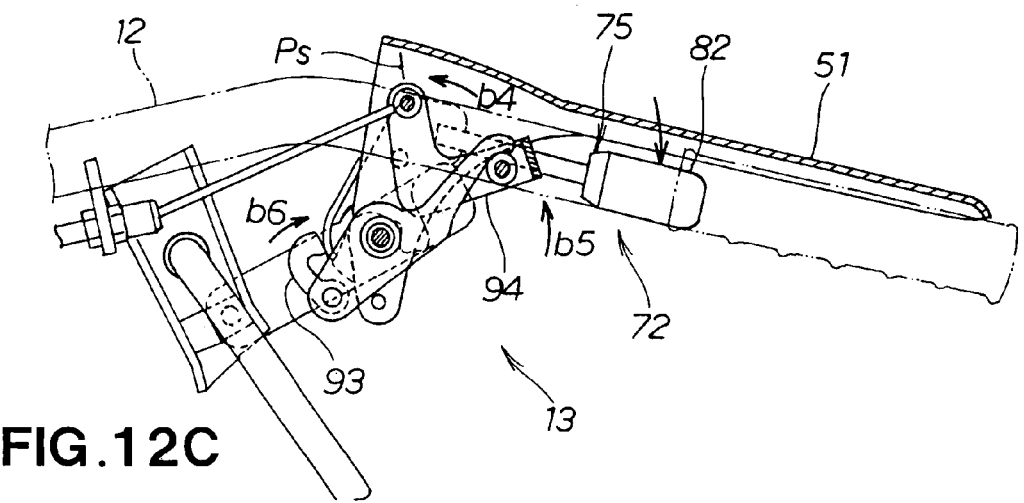

FIGS. 12A-12C show behavior when the clutch is turned off in response to the human operator operating the first clutch-OFF switch mechanism 75, in which illustration of the side clutch lever 27 is omitted to facilitate understanding. The following paragraphs describe the behavior with combined reference to FIGS. 12A-12C and FIG. 4.

Once the human operator depresses the operating section 82 of the first clutch-OFF switch mechanism 75, as indicated by an arrow b1 in FIG. 12A, while gripping the main clutch lever 51, the claw-disengaging section 97 flips up the ratchet 93 in a direction of an arrow b2 against the biasing force of the claw spring 142.

Referring to FIG. 12B, once the ratchet 93 is flipped up, the second pivot member 94 starts reverse-pivoting (i.e., pivoting counterclockwise in the figure) as indicated by an arrow b4, and thus, the first pivot member 92 reverse-pivots (i.e., pivots counterclockwise in the figure) as indicated by an arrow b5. At that time, the ratchet 93 pivots, by the biasing force of the claw spring 142 (FIG. 4), while pressing the claw-disengaging section 97 of the first clutch-OFF switch mechanism 75.

As shown in FIG. 12C, the clutch mechanism 42 (FIG. 1) is brought back to the OFF state once the second member 94 returns to the initial position Ps.

As set forth above, the operation mechanism 13 in the instant embodiment includes the clutch-OFF mechanism 72 that, in response to the human operator operating the first clutch-OFF mechanism 75 disposed near the operating handle 12, places the clutch mechanism 42 in the OFF state by canceling the connection between the main clutch lever 51 and the second pivot member 94. With such a clutch-OFF mechanism 72, the operation mechanism 13 can place the clutch mechanism 42 in the OFF state even while the main clutch lever 51 is being gripped, to thereby enhance the operability.

Once the human operator releases the operating section 82 of the main clutch lever 51 and releases the main clutch lever 51, the main clutch lever 51 is returned to the clutch-OFF position Cf via the clutch lever spring 133.

Once the main clutch lever 51 returns to the clutch-OFF position Cf, the ratchet 93 pivots (in a direction of arrow b6) to engage with the tooth portion 66 of the lock plate 65 (see FIG. 3) and simultaneously presses the claw-disengaging section 97 of the first clutch-OFF switch mechanism 75, so that the operating section 82 returns to the initial position (FIG. 3).

Figure 13A:
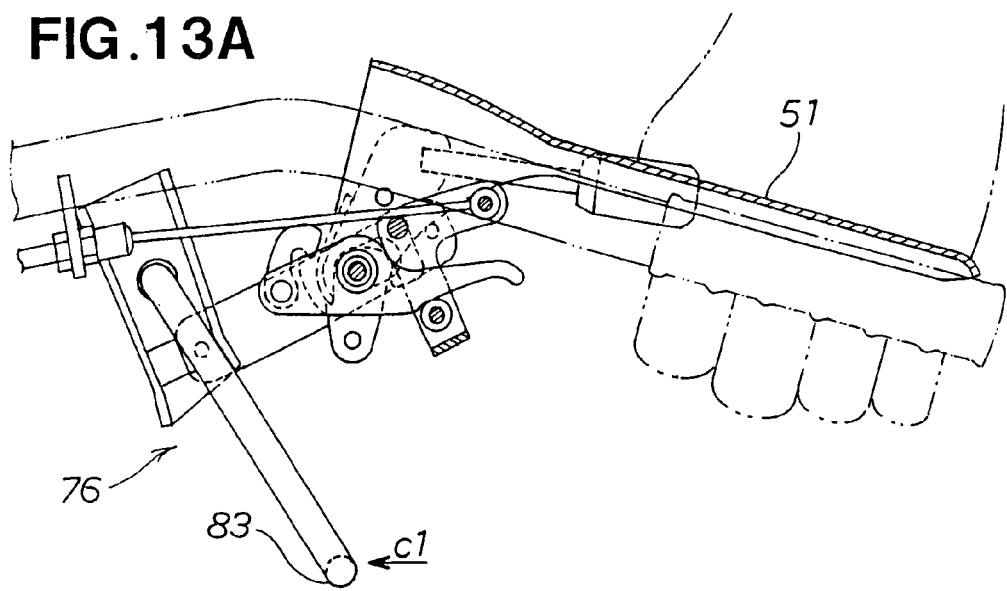
FIGS. 13A-13C are views showing behavior when a second clutch-OFF switch mechanism has been operated.
Figure 13B:
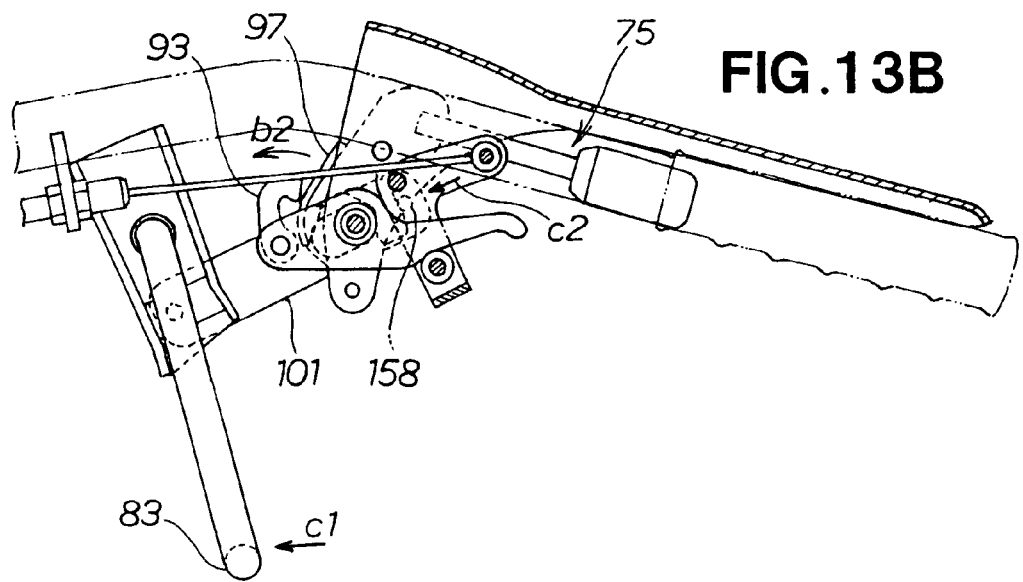
Figure 13C:
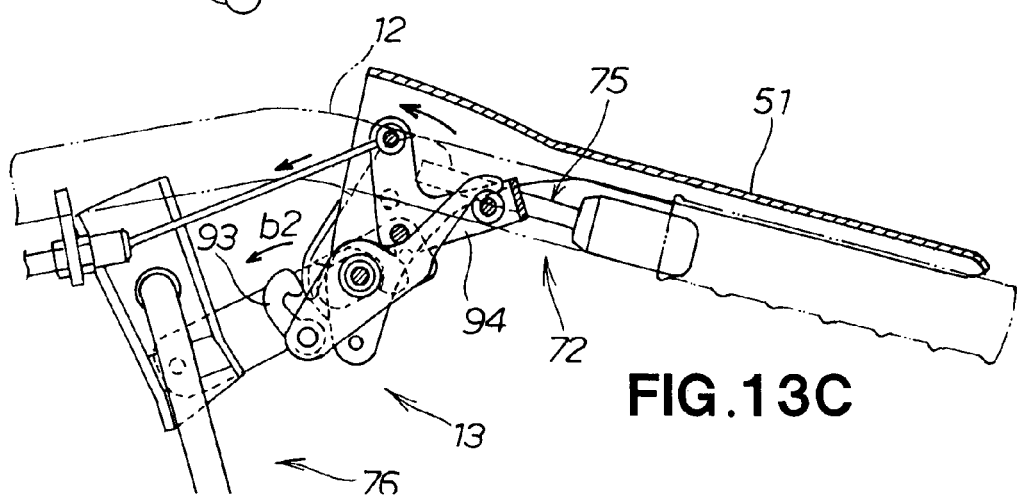

FIGS. 13A-13C show a manner in which the second clutch-OFF switch mechanism 76 and the first clutch-OFF switch mechanism 75 interlock with each other in response to human operator's operation of the switch mechanism 76.

Namely, the human operator pushes forward the emergency stop lever 83 of the second clutch-OFF switch mechanism 76, as indicated by the arrow c1 in FIG. 13A, while gripping the main clutch lever 51.

Once the emergency stop lever 83 is pushed forward as noted above, the projecting pin 158 of the meshing-engagement disengaging plate 101 pushes forward the force receiving portion 154 of the first clutch-OFF switch mechanism 75 (FIG. 8) as indicated by the arrow c2. Consequently, the claw-disengaging section 97 flips up the ratchet 93 as indicated by the arrow b2 against the biasing force of the claw spring 142 (FIG. 4). In this way, the first clutch-OFF switch mechanism 75 interlocks with the second clutch-OFF switch mechanism 76 when the latter 76 has been operated by the human operator.

Once the ratchet 93 is flipped up as shown in FIG. 13C, the clutch mechanism 42 (FIG. 1) is brought to the OFF state in the same manner as in FIG. 12C.

Namely, once the second clutch-OFF switch mechanism 76 is operated by the human operator, the operating force is transmitted from the second clutch-OFF switch mechanism 76 to the first clutch-OFF switch mechanism 75, so that the clutch-OFF mechanism 72 is automatically operated. As a result, the above-described embodiment can turn off the clutch mechanism 42 even while the main clutch lever 51 is being gripped by the human operator, and can thereby significantly enhance the operability.

Whereas the operation mechanism of the working machine of the present invention has been described above as applied to a tilling machine, it may be applied to other machines than tilling machines.

Obviously, various minor changes and modifications of the present invention are possible in light of the above teaching. It is therefore to be understood that within the scope of the appended claims the invention may be practiced otherwise than as specifically described.

What is claimed is:

1. An operation mechanism of a working machine comprising:
    a main clutch lever provided pivotably about a first pivot point on a support bracket fixed to an operating handle;
    a pivot member provided pivotably about a second pivot point on said support bracket, said pivot member being pivotable in response to a pivoting operation of said main clutch lever; and
    a cable member for turning on a clutch mechanism in response to pivoting movement of said main clutch lever,
    wherein said pivot member includes a cable connection section to which one end portion of said cable member is connected so that by pulling said cable member in response to a pivotal operation of said main clutch lever to a fully pivoted state, said clutch mechanism is turned on, and by releasing said main clutch lever to a released state, said clutch mechanism is turned off,
    wherein said second pivot point, in said released state of said main clutch lever as well as in said fully pivoted state of said main clutch lever, is disposed between said first pivot point and a portion of said cable member located near said cable connection section, and
    wherein in the fully pivoted state of the main clutch lever, said cable member is located nearest to said pivot point of the pivot member.

2. The operation mechanism of claim 1, which further comprises a first clutch-OFF switch mechanism disposed near the operating handle, and a clutch-OFF mechanism for canceling connection between said main clutch lever and said pivot member, in response to operation of said first clutch-OFF switch mechanism, to turn off the clutch mechanism.

3. The operation mechanism of claim 2, wherein said clutch-OFF mechanism further includes a second clutch-OFF switch mechanism rotatably supported on the operating handle and disposed beneath the operating handle, and, when said second clutch-OFF switch mechanism is operated, said clutch-OFF mechanism transmits operating force from said second clutch-OFF switch mechanism to said first clutch-OFF switch mechanism to turn off the clutch mechanism.

* * * * *